(12) United States Patent
Alrousan

(10) Patent No.: US 12,258,134 B1
(45) Date of Patent: Mar. 25, 2025

(54) EMERGENCY LANDING PARACHUTE-BALLOON SYSTEM

(71) Applicant: Ahmad N. Alrousan, Lombard, IL (US)

(72) Inventor: Ahmad N. Alrousan, Lombard, IL (US)

( * ) Notice: Subject to any disclaimer, the term of this patent is extended or adjusted under 35 U.S.C. 154(b) by 0 days.

(21) Appl. No.: 18/381,539

(22) Filed: Oct. 18, 2023

(51) Int. Cl.
*B64D 17/80* (2006.01)

(52) U.S. Cl.
CPC .................................... *B64D 17/80* (2013.01)

(58) Field of Classification Search
CPC ......... B64D 17/80; B64D 25/12; B64D 25/18
See application file for complete search history.

(56) References Cited

U.S. PATENT DOCUMENTS

| | | | | |
|---|---|---|---|---|
| 3,315,920 | A | * 4/1967 | Caughron | B64D 25/12 244/139 |
| 4,298,177 | A | * 11/1981 | Berlongieri | B64D 17/80 244/105 |
| 6,164,595 | A | 12/2000 | Williams | |
| 8,794,567 | B2 | * 8/2014 | Adir | B64C 15/14 244/52 |
| 2003/0127565 | A1 | 7/2003 | Haffen | |

* cited by examiner

*Primary Examiner* — Nicholas McFall
(74) *Attorney, Agent, or Firm* — Sanchelima & Associates, P.A.; Jesus Sanchelima; Christian Sanchelima

(57) ABSTRACT

An emergency aircraft parachute-balloon system for assisting landings during abnormalities. Integrated modular enclosures house inflatable balloon-like apparatuses made of parachute materials along the fuselage. A sliding door seals each enclosure. A control system allows the pilot to remotely deploy balloons. Multiple balloons provide redundancy. Once deployed, the balloons gently bring down the aircraft to avoid crashes. Spacing prevents tangling. The customizability and aircraft integration distinguishes this invention from prior individual ejection/parachuting systems. Overall, this parachute-balloon system enables safe emergency landings to save lives.

6 Claims, 3 Drawing Sheets

EMERGENCY LANDING PARACHUTE-BALLOON SYSTEM

1. FIELD OF THE INVENTION

The present invention relates to emergency aircraft systems and, more specifically, to an emergency landing parachute-balloon system comprising a plurality of inflatable balloon-like apparatuses formed of parachute materials that are housed in enclosures along the fuselage of an aircraft. The balloons can be remotely deployed by a pilot to gently bring down an aircraft in the event of an emergency. Multiple redundancy balloons are used to provide reliability. The balloons are designed to assist in emergency landings and prevent crashes when abnormal conditions are detected.

2. DESCRIPTION OF THE RELATED ART

Several designs for emergency aircraft systems involving ejection seats, inflatable floats, and parachutes have been explored in the past. However, none have proposed a system of inflatable balloon-like apparatuses made of parachute materials that are housed in enclosures integrated along the fuselage of an aircraft and can be remotely deployed by the pilot when needed. The presented invention comprises multiple redundant balloon systems for reliability, where the balloons are spaced along the fuselage to prevent tangling during deployment. The balloons provide a gentle means of bringing down an aircraft during an emergency, averting crashes and saving lives. Past designs have focused on individual ejection and parachuting systems, whereas this invention utilizes the aircraft itself as a platform for integrated emergency parachute balloons that can be selectively deployed. The modular design allows for customization based on aircraft dimensions and redundancy needs.

Applicant believes that a related reference corresponds to U.S. Pat. No. 6,164,595 issued for a helium actuated airplane parachute including an airplane having a rectangular compartment formed therein with an associated top opening. A flexible inelastic parachute is included having a closed hemispherical configuration with an open bottom having a peripheral edge. A plurality of strings each have a first end spacedly coupled to the peripheral edge and a second end mounted to a bottom face of the compartment. A helium gas tank is situated adjacent the compartment. The gas tank is connected to an actuator valve mounted on the bottom face of the compartment below the parachute when in a folded undeployed orientation. The actuator valve is adapted to release gas within the compartment thereby deploying the parachute.

Applicant believes that another related reference corresponds to U.S. patent application No. 2003/0127565 issued for a device that comprises an integration of three pressurized parachutes, which are determined by the weight of each section of the airplane, also comprising an air compressor battery or generator that controls the constant air pressure and release valve of this system. However this system functions on its own by pushing the switch in the cockpit, then it releases the system. This system also runs off its own airflow system, not the airplanes pressurized functions. When releasing the system, pressurized air is released from holding the Air, Spring Rod Locking Shoes, this frees the arrow dynamic pressurized doors which are connected and manufactured with the fire proof parachute. This allows the parachute to spring out and do their job, also there can be another switch hooked to the system for a floatation on device that works the same way underneath the plane. None of these references, however, teach of an emergency aircraft crash prevention system comprising a plurality of balloon-like apparatuses formed of parachute materials, wherein the balloons are housed in the window frame of the aircraft and are remotely deployed by the pilot in the cockpit.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide an emergency deployable parachute-balloons for aircrafts that would be utilized for emergency landings.

It is another object of this invention to provide a system that would gently direct an airplane downwards in the event of engine failure or other related problems.

It is still another object of the present invention to provide a system that would serve as a backup or failsafe means of controlling and landing an aircraft that would otherwise crash, potentially saving lives by doing so.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
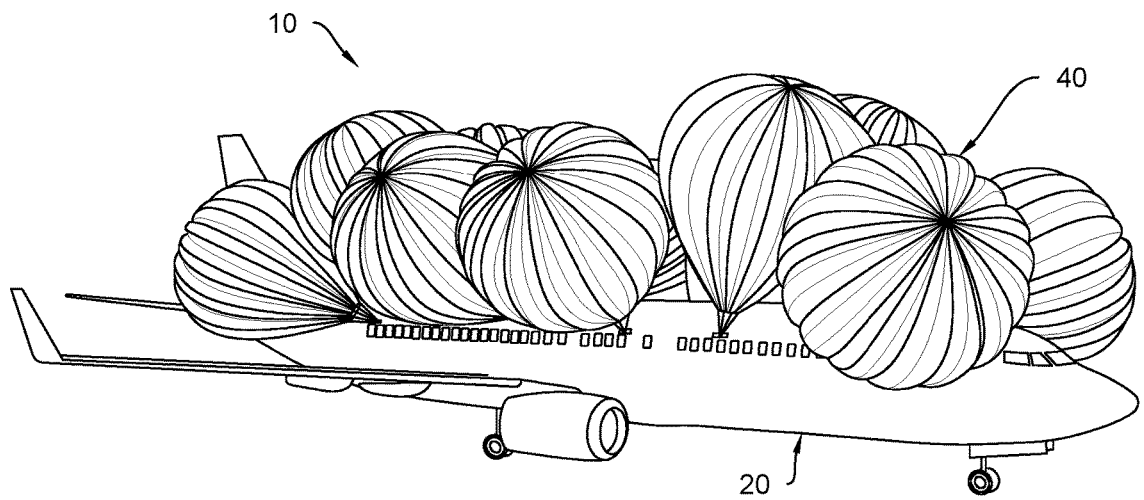
FIG. 1 represents an operational view of the present invention.

Referring now to the drawings, where the present invention is generally referred to with numeral 10, it can be observed that it basically includes an aircraft 20, an enclosure assembly 30, a plurality of balloon-like apparatuses 40 and a control assembly 50. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
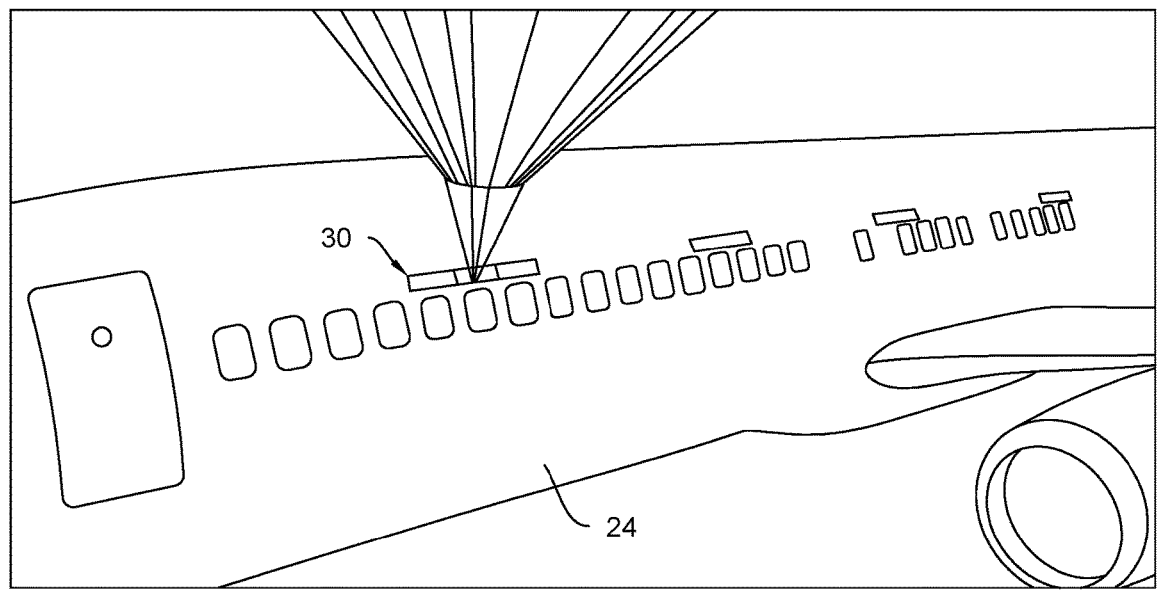
FIG. 2 shows a closed-up view of the present invention according to an exemplary embodiment thereof.
Figure 3:
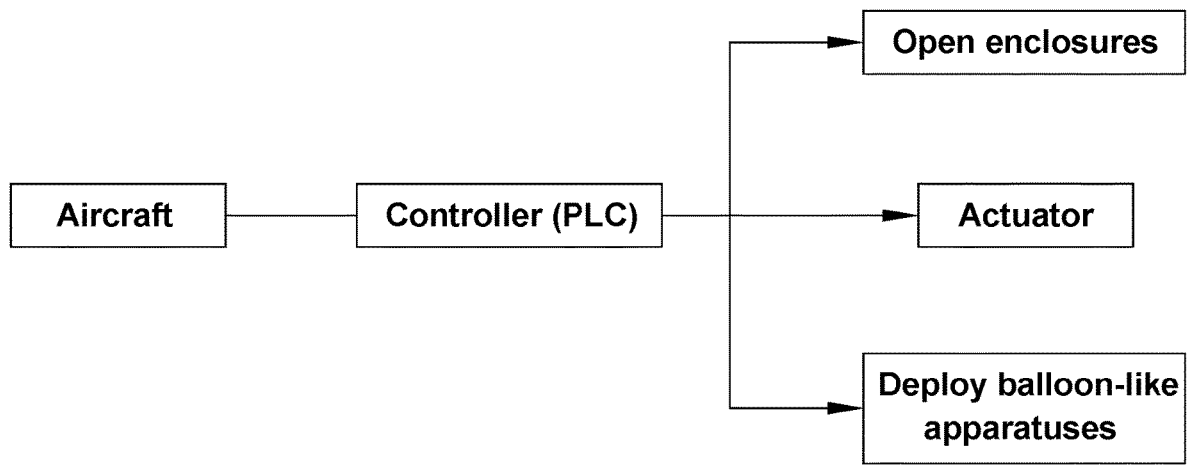
FIG. 3 illustrates an schematic view of the present invention according to an exemplary embodiment.

As better depicted in FIG. 1 the plurality of balloon-like apparatuses 40 may be deployed from fuselage 24 of the aircraft 20. Especifically, from a plurality of enclosures, each termed as enclosure assembly 30, where the balloon-like apparatuses 40 are stored during normal state of operation. Wherein the balloon-like apparatuses 40 are deployed by means of the control assembly 50, multiple balloon-like apparatuses 40 may be used to provide redundancy and enhance reliability. Once deployed, the balloon-like apparatuses 40 may be used to assist landing of the aircraft 20 when abnormal conditions are detected. The balloon-like apparatuses 40 may be formed of parachute materials such as ripstop nylon, polyester film, polyethylene, or any other suitable material as known in the art. Said aircraft 20, as widely known in the art, may include a cockpit 22 and a fuselage 24. Wherein a pilot may control and deploy the balloon-like apparatuses 40 from the cockpit 22, and multiple of said enclosure assembly 30 may be located through the fuselage 24 as depicted in FIG. 1-2.

Figure 4:
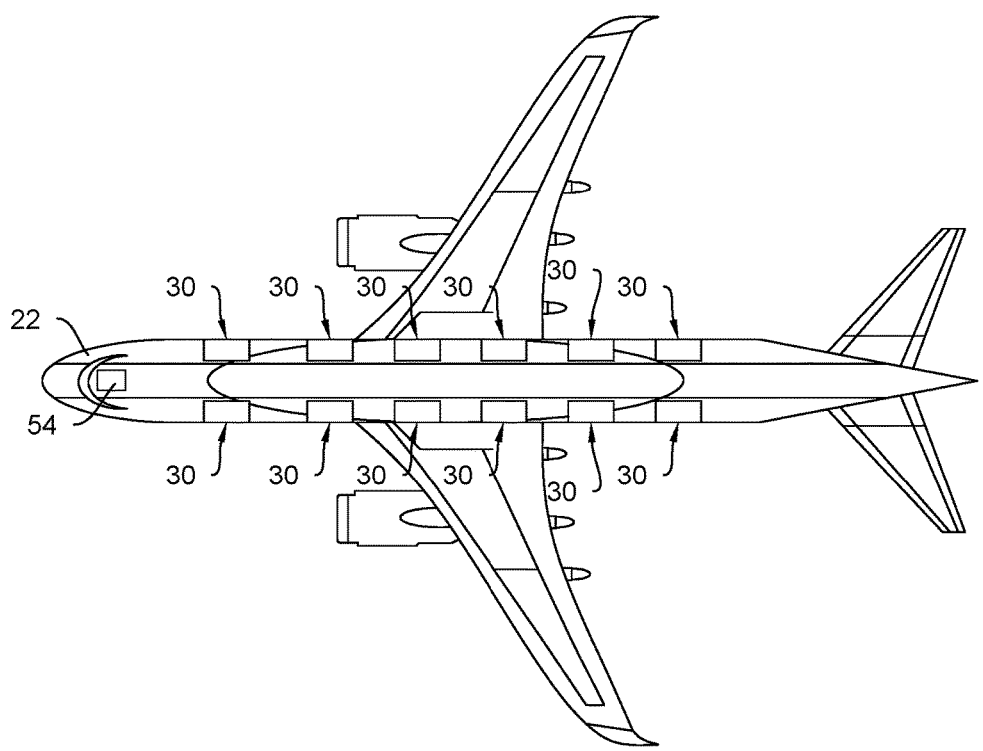
FIG. 4 is a representation of an schematic view of the ballo-like parachute system disposed along the fuselage of the aircraft.
Figure 5A:
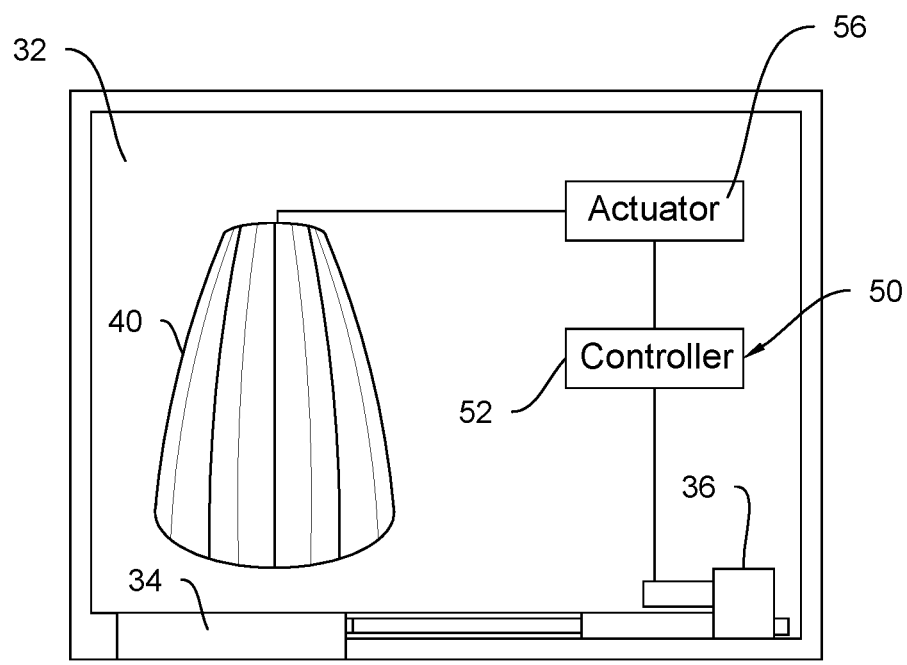
FIG. 5A is a schematic representation of the present invention according to an exemplary embodiment thereof.
Figure 5B:
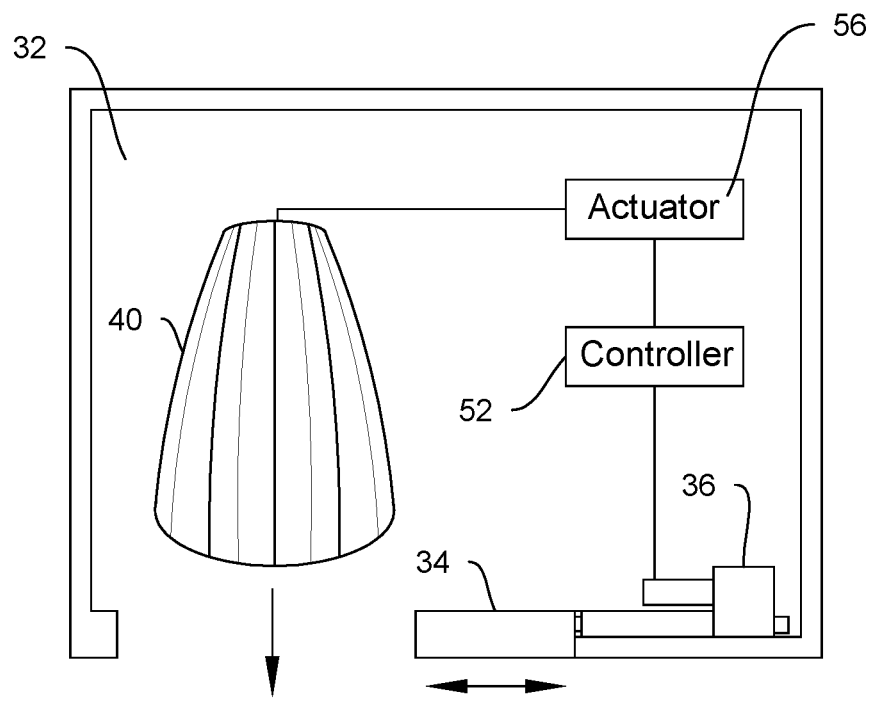
FIG. 5B is a schematic representation of the present invention according to an exemplary embodiment thereof.

The enclosure assembly 30 may be a box-like compartment with a suitable volume to store one of the balloon-like apparatuses 40 therein. The enclosure assembly 30 may include an inner chamber 32, an enclosure sliding door 34 (also termed as sliding door), and a door actuator 36. As depicted in FIG. 2 and FIG. 4, it may be suitable to locate multiple enclosure assemblies on the left and right sides of the fuselage 24 (for instance in the window frame of the aircraft 20), wherein the multiple enclosure assemblies are equidistant and separated by a predetermined distance. It is important to note that the distance that separates each of the compartments may be subject to the dimensions of the balloon-like apparatuses 40 when deployed to avoid tangling or collisions. If two enclosure assemblies holding balloon-like apparatuses 40 are positioned too closely together along the fuselage 24, there is a risk of the balloon-like apparatuses 40 tangling with each other or even colliding. This can lead to balloon-like apparatuses 40 malfunction and a dangerous situation for the crew or payload. A predetermined space separating each enclosure assembly 30 may ensure that each of the balloon-like apparatuses 40 can operate without interference. In a suitable embodiment, the present invention 10 may include six enclosure assemblies on the left side and six enclosure assemblies on the right side of the fuselage 24 as depicted in FIG. 1 and FIG. 4. However, in different embodiments the number of enclosure assemblies may depend on the dimensions of both the aircraft 20 and each of the balloon-like apparatuses 40. Referring now to FIG. 5A-5B, it can be appreciated that the enclosure assembly 30 may be operatively connected to a controller 52 and a deployment actuator 56. Furthermore, the sliding door 34 may be located on a front side of the enclosure assembly 30 which leads to the exterior of the enclosure and, therefore, of the fuselage 24. A distal end of sliding door 34 may be connected to the door actuator 36. Which, in one exemplary embodiment, may be a linear actuator that permits to open and close the door along the horizontal axis. There are, nevertheless, various mechanisms and devices that can be used to replace a linear actuator for remotely opening the sliding door 34. The choice of mechanism may depend on factors such as the door's size and weight, the desired level of automation, and the specific application; in one alternative embodiment, an electric motor coupled with a system of gears to covert rotatory motion into linear motion can be used to open and close the sliding door 34 remotely; in another embodiment, a pneumatic or hydraulic cylinder may be used. It should be understood that the aforementioned devices and mechanisms are hereby presented for explanatory purposes, and that other suitable devices and technologies from the art may be used. It should be understood that the sliding door 34 when closed may create a snug seal that ensures that the sliding door does not create unnecessary drag; to provide whether protection; ensuring that the balloon-like apparatuses 40 are stored under the optimal conditions until deployment; for safety purposes as t reduces the risk of unintended openings during flight. When opened, the sliding door may create a space for the balloon-like apparatuses 40 to be deployed from the inner chamber 32.

Referring now to the controller assembly 50, it may include a controller 52 for each enclosure assembly 30, a deployment actuator 56 for each enclosure assembly 30 and a main controller 54. As showcased in FIG. 5A-5B, the controller 52 may be responsible for both deploying the balloon-like apparatuses 40 and actuating the sliding door 34. The controller 52 may receive signals or commands from the main controller 54 located in the cockpit 22 (as shown in FIG. 4) indicating the need to deploy the parachute-like balloons 40 and open the sliding door 34. The controller 52 may be programmed to ensure that the deployment of 40 and the opening of the sliding door 34 occur in a coordinated sequence. The deployment actuator 56 may be responsible for physically releasing or deploying the parachute-like balloons 40 when instructed by the controller 52. This actuator may use various mechanisms, such as pyrotechnic devices, mechanical actuators, or pneumatic systems, depending on the design and requirements of the system. The deployment actuator 56 may incorporate safety features to prevent accidental or premature deployment. These features can include latches, locks, or electronic interlocks that are released only when the controller provides the appropriate signal.

It should be understood that the present invention is solely intended for operation by the pilot when a mayor problem exists and the aircraft may otherwise crash.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An emergency landing parachute-balloon system, comprising:
   a) an aircraft having a fuselage;
   b) multiple enclosure assemblies mounted on lateral sides of the fuselage, wherein each enclosure assembly includes a sliding door coupled to a door actuator and houses a balloon formed of parachute materials;
   c) a control assembly including a controller and a deployment actuator enclosed within the enclosure assembly, wherein the controller is electrically connected to the door actuator and to the deployment actuator, wherein said deployment actuator is operatively connected to the balloon; and
   d) wherein by means of a main controller located on a cockpit of the aircraft, the controller receives an actuation signal to open the sliding door by actuating the door actuator and to deploy the balloon by means of activating the deployment actuator.

2. The emergency landing parachute-balloon system of claim 1, wherein said enclosure assembly includes an inner chamber dimensioned to store said balloon prior to deployment.

3. The emergency landing parachute-balloon system of claim 1, wherein said door actuator is a linear actuator.

4. The emergency landing parachute-balloon system of claim 1, wherein said sliding door when in closed position creates a seal.

5. An emergency landing parachute-balloon system, comprising:
- an aircraft having a fuselage; multiple enclosure assemblies mounted on window frames at lateral sides of the fuselage, wherein each enclosure assembly includes a sliding door coupled to a door actuator wherein the actuator is a linear actuator and each enclosure assembly houses a balloon formed of parachute materials, said sliding door having a closed and an opened position, wherein said sliding door creates a seal when in closed position;
- a control assembly including a controller and a deployment actuator enclosed within the enclosure assembly, wherein the controller is electrically connected to the door actuator and to the deployment actuator, wherein said deployment actuator is operatively connected to the balloon; and
- wherein by means of a main controller located on a cockpit of the aircraft, the controller receives an actuation signal to open the sliding door by actuating the door actuator and to deploy the balloon from an inner chamber of the enclosure assembly by means of the deployment actuator.

6. An emergency landing parachute-balloon system, consisting of:
- an aircraft having a fuselage;
- six enclosure assemblies mounted on window frames each at lateral sides of the fuselage, wherein each enclosure assembly includes a sliding door coupled to a door actuator, wherein the actuator is a linear actuator and each enclosure assembly houses a balloon formed of parachute materials, said sliding door having a closed and an opened position, wherein said sliding door creates a seal when in closed position, the enclosure assembly having a rectangular geometry;
- a control assembly including a controller and a deployment actuator enclosed within the enclosure assembly, wherein the controller is electrically connected to the door actuator and to the deployment actuator, wherein said deployment actuator is operatively connected to the balloon; and
- wherein by means of a main controller located on a cockpit of the aircraft, the controller receives an actuation signal to open the sliding door by actuating the door actuator and to deploy the balloon from an inner chamber of the enclosure assembly by means of the deployment actuator.

* * * * *